United States Patent Office 3,138,545
Patented June 23, 1964

3,138,545
DEHYDRATION OF N,N-DIMETHYLHYDRAZINE BY DISTILLATION IN THE PRESENCE OF AN ALKALI
Sherman K. Reed, Middleport, N.Y., and Paul E. Levesque and John A. Pianfetti, Charleston, and Harold M. Vessey, South Charleston, W. Va., assignors to FMC Corporation, a corporation of Delaware
No Drawing. Filed May 10, 1955, Ser. No. 507,492
10 Claims. (Cl. 202—57)

This invention relates to a dehydration process. In one of its more particular aspects this invention relates to a process for the production of substantially anhydrous substituted hydrazines.

These substituted hydrazines may in general be represented by the formula:

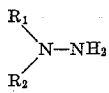

wherein $R_1$ and $R_2$ represent alkyl radicals. For the purpose of clarity of expression these hydrazines will be referred to hereinafter as dialkyl hydrazines.

Dialkyl hydrazines find application in a wide variety of fields including use as rocket and jet propellants, gas absorbents, anti-oxidants, plasticizers, rubber vulcanizers, and the like.

The preparation of dialkyl hydrazines by methods known to the art, such as the chemical reduction of nitrosamines with zinc and acetic acid, results in aqueous solutions of the hydrazines. For most uses it is generally desired to have anhydrous compounds rather than the aqueous solutions obtained. An approach to the production of an anhydrous dialkyl hydrazine was made by Hatt and described in Organic syntheses, vol. 16, 22 (1936). This reference discloses the preparation of unsymmetrical-dimethylhydrazine from dimethylamine hydrochloride via the nitrosamine and describes a procedure for obtaining the anhydrous dimethylhydrazine.

This prior art procedure includes the following steps:

(1) Treating with concentrated HCl to form dimethylhydrazine hydrochloride,
(2) Concentrating the hydrochloride by heating on a steam bath under reduced pressure,
(3) Allowing the syrupy hydrochloride to drop onto a large excess of solid NaOH,
(4) Distilling until the temperature reaches 100° C.,
(5) Allowing the concentrated aqueous solution to stand over KOH,
(6) Redistilling,
(7) Collecting the free dimethylhydrazine over BaO, and
(8) Redistilling.

It can be seen that this procedure requires a long and involved series of steps which are not readily adaptable to commercial operation.

An object of this invention is to provide a simpler process for the dehydration of dialkyl hydrazines.

Another object of this invention is to provide a suitable process for the dehydration of dialkyl hydrazines on a commercial scale.

It is another object of this invention to provide substantially anhydrous dialkyl hydrazines.

Further objects and advantages of this invention will become apparent in the course of the following detailed description and disclosure.

We have found that dialkyl hydrazines can be prepared in substantially anhydrous form simply by treating the aqueous solution of the dialkyl hydrazine with alkali and distilling the free anhydrous dialkyl hydrazine from the solution.

Thus, the multiplicity of prior art steps is reduced to two simple steps which are readily adaptable to commercial operations. The steps of forming the hydrochloride of the dialkyl hydrazine and the ensuing concentration steps, the many distillations and the necessity of collecting the product over a base have been eliminated in the process of this invention.

In general, this process may be used for the dehydration of aqueous solutions of dialkyl hydrazines whose boiling points are below that of the alkaline solution used in the dehydration.

Any readily soluble mineral alkali may be used in carrying out the dehydration process of this invention. Sodium hydroxide and potassium hydroxide are especially satisfactory reagents because of their low cost and availability.

The alkali may be added as a solid or in the form of a solution, but the resulting solution should have a concentration in the range of from about 10% to about 70% by weight on a hydrazine-free basis. Concentrations of alkali above about 70% may give handling troubles, while the concentrations below 10% will be necessary, in order to obtain the desired anhydrous material, to use a more efficient fractionating column than is ordinarily necessary or to recycle several times. A particularly satisfactory range is from about 30% to about 50% by weight of alkali. The amount of alkali added will, of course, depend upon the concentration of the dialkyl hydrazine to be dehydrated.

Anhydrous dialkyl hydrazines containing less than about 0.5% water may be prepared by using the process of this invention. Even lesser concentrations of water may be realized by recycling until the desired concentration is attained.

The invention will be better understood by reference to the following examples, which are included for purposes of illustration only and are not to be construed as in any way limiting the scope of the invention.

*Example 1*

1000 lbs. of an aqueous solution of dimethylhydrazine having a concentration of 17.5% was charged to a still and 540 lbs. of flake NaOH added to give a 40% NaOH-water solution (dimethylhydrazine-free basis). The mixture was rectified at 30% take-off in a 15 ft. packed column. 122 lbs. of dimethylhydrazine containing less than 0.3 vol. percent water was recovered as distillate.

*Example 2*

700 lbs. of an aqueous solution of dimethylhydrazine having a concentration of 20% was charged to a still and 888 lbs. of a 50% NaOH solution added to give a 30% NaOH-water solution (dimethylhydrazine-free basis). The mixture was brought to distillation temperature and fractionated with a 30% take-off. The temperature of the pot was 75° C., that of the vapor 64° C. Dimethylhydrazine containing less than 0.3% water was obtained in an 87% yield.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A process for dehydrating an aqueous preparation of N,N-dimethylhydrazine which comprises distilling the N,N-dimethylhydrazine in the presence of an alkali selected from the group consisting of sodium hydroxide and potassium hydroxide, the alkali being present in quantity sufficient to produce a solution containing about 10% to 50% by weight of said alkali on the combined alkali-water basis, and removing a distillate of N,N-dimethylhydrazine containing less than 0.5% water by volume.

2. The process of claim 1 in which the alkali is sodium hydroxide.

3. The process of claim 1 in which the alkali is potassium hydroxide.

4. In the separation of unsymmetrical dimethylhydrazine from aqueous solution, the step of distilling an aqueous solution of unsymmetrical dimethylhydrazine containing not more than about 20 mole percent of unsymmetrical dimethylhydrazine and about 9 to 30 weight percent of caustic soda.

5. The method of claim 4 in which the caustic soda is present in an amount of about 9 to 15 percent.

6. In the separation of unsymmetrical dimethylhydrazine from dilute aqueous solution, the step of distilling a dilute aqueous solution of unsymmetrical dimethylhydrazine containing about 9 to 30 weight percent of caustic soda.

7. The method of claim 6 in which the caustic soda is present in an amount of about 9 to 15 percent.

8. In the separation of unsymmetrical dimethylhydrazine from dilute aqueous solution, the step of distilling a dilute aqueous solution of unsymmetrical dimethylhydrazine containing about 9 to 35 weight percent of caustic soda.

9. The method of claim 8 in which the caustic soda is present in an amount of about 9 to 15 percent.

10. In the separation of unsymmetrical dimethylhydrazine from aqueous solution, the step of distilling an aqueous solution of unsymmetrical dimethylhydrazine containing not more than about 20 mole percent of unsymmetrical dimethylhydrazine and about 1 to 45 weight percent of caustic soda.

References Cited in the file of this patent

UNITED STATES PATENTS

| | | |
|---|---|---|
| Re. 15,783 | Hammond | Mar. 4, 1924 |
| 2,022,274 | Brooks | Nov. 26, 1935 |
| 2,690,378 | Penneman | Sept. 28, 1954 |
| 2,698,286 | Bircher | Dec. 28, 1954 |
| 2,774,725 | Swenson | Dec. 18, 1956 |

UNITED STATES PATENT OFFICE
CERTIFICATE OF CORRECTION

Patent No. 3,138,545                                   June 23, 1964

Sherman K. Reed et al.

It is hereby certified that error appears in the above numbered patent requiring correction and that the said Letters Patent should read as corrected below.

Column 1, line 36, before "obtained" insert -- thus --; line 38, for "syntheses" read -- Syntheses --; column 2, line 25, for "the" read -- with --; same line 25, after "10%" insert -- it --.

Signed and sealed this 10th day of November 1964.

(SEAL)
Attest:

ERNEST W. SWIDER                                  EDWARD J. BRENNER
Attesting Officer                                        Commissioner of Patents